(12) United States Patent
Musumeci et al.

(10) Patent No.: US 11,030,642 B2
(45) Date of Patent: Jun. 8, 2021

(54) QUALITATIVE USER ASSESSMENT IN ONLINE VIDEO ADVERTISING

(71) Applicant: Yahoo Holdings, Inc., Sunnyvale, CA (US)

(72) Inventors: Gian-Paolo Musumeci, Berkeley, CA (US); Sharon Paisner, Berkeley, CA (US); Dylan Sather, San Francisco, CA (US)

(73) Assignee: Verizon Media Inc., New York, NY (US)

(*) Notice: Subject to any disclaimer, the term of this patent is extended or adjusted under 35 U.S.C. 154(b) by 375 days.

(21) Appl. No.: 14/608,992

(22) Filed: Jan. 29, 2015

(65) Prior Publication Data
US 2015/0213479 A1    Jul. 30, 2015

Related U.S. Application Data (60) Provisional application No. 61/932,983, filed on Jan. 29, 2014.

(51) Int. Cl.
| | |
|---|---|
| *G06Q 30/02* | (2012.01) |
| *H04N 21/442* | (2011.01) |
| *H04N 21/81* | (2011.01) |
| *H04N 21/258* | (2011.01) |
| *H04N 21/24* | (2011.01) |

(52) U.S. Cl.
CPC ..... *G06Q 30/0242* (2013.01); *G06Q 30/0264* (2013.01); *G06Q 30/0275* (2013.01); *H04N 21/2408* (2013.01); *H04N 21/25891* (2013.01); *H04N 21/44218* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 6,601,014 B1* | 7/2003 | Dempsey | H04M 15/47 702/108 |
| 8,103,543 B1* | 1/2012 | Zwicky | G06Q 30/02 705/14.26 |
| 8,271,413 B2* | 9/2012 | Agarwal | G06N 5/02 706/46 |
| 9,456,343 B1* | 9/2016 | Mihalache | H04L 63/0892 |
| 9,781,452 B2* | 10/2017 | Geller | G06F 16/7867 |

(Continued)

OTHER PUBLICATIONS

Chu, Zi "Detecting Abnormal Behavior in Web Applications" William and Mary Scholar Works, p. 125-126 https://scholarworks.wm.edu/cgi/viewcontent.cgi?article=3146&context=etd (Year: 2012).*

(Continued)

*Primary Examiner* — Michael W Schmucker
*Assistant Examiner* — Alfred H Tsui
(74) *Attorney, Agent, or Firm* — Cooper Legal Group, LLC (57) ABSTRACT

Whether video advertisements are being delivered to a human user or a machine is determined passively, i.e., without having the user to perform any explicit actions. Based on the time and frequency of ad requests generated from a user device, a daily schedule is estimated for the user. The estimated daily schedule is compared with a daily schedule pattern to determine whether the user is a human user or not.

20 Claims, 6 Drawing Sheets

(56) References Cited

U.S. PATENT DOCUMENTS

| | | | | |
|---|---|---|---|---|
| 2007/0061211 A1* | 3/2007 | Ramer | ................... | G06Q 20/12 |
| | | | | 705/25 |
| 2014/0358671 A1* | 12/2014 | Wei | ................... | G06Q 30/0248 |
| | | | | 705/14.45 |
| 2015/0156084 A1* | 6/2015 | Kaminsky | ........... | H04L 63/1466 |
| | | | | 709/224 |

OTHER PUBLICATIONS

Chamila Kumara Walgampaya "Click fraud : how to spot it, how to stop it?" University of Louisvilles's Institutional Repository, p. 29 and 17 https://ir.library.louisville.edu/cgi/viewcontent.cgi?article=2498&context=etd (Year: 2011).*

* cited by examiner

QUALITATIVE USER ASSESSMENT IN ONLINE VIDEO ADVERTISING

CROSS REFERENCE TO RELATED APPLICATIONS

This application claims the benefit of U.S. Provisional Patent Application No. 61/932,983, filed on Jan. 29, 2014, and which is incorporated by reference herein in its entirety.

TECHNICAL FIELD

The present document relates to Internet based digital video advertising.

BACKGROUND

Online advertisers pay for the opportunity to display their ads to online users. Many online information providers, such as web site operators, generate revenue by placing advertisements on their web pages accessed by online users. Online advertisements can be in various forms, including banners of text or graphics placed within the web page being displayed to a user. In recent years, multimedia ads, including digital video segments, have been gaining popularity in online advertising. Video is often a compelling medium to communicate a commercial message more forcefully. Online video advertising tends to be resource intensive and, as such, advertisers have to pay more money for placing video advertisements.

SUMMARY

Techniques are disclosed for assessing whether an online video advertisement delivered to a user device is being displayed to a user or a machine. A determination is made about a user's viewing habits and daily schedule based on a user's short term and/or long term interactions with online video advertisements. In some embodiments, based on the determination of the user's daily schedule, advertisements are targeted to the user using subjective time-of-day for the user. In some embodiments, based on the determination of whether the user is a human being or a machine, future deliveries of video advertisements to the user are controlled.

In one exemplary aspect a method for determining whether an entity generating impressions for an online video advertisement is disclosed. The method includes receiving, at a computer, ad viewing information for a user, calculating, by the computer, based on the ad viewing information, a short term usage pattern for the user, generating, by the computer, based on the ad viewing information, a long term usage pattern for the user, wherein the short term usage pattern is generated over a first time interval that is smaller than the second time interval for generating the long term usage pattern, and making, by the computer, based on one or both of the short term usage pattern and the long term usage patterns, a qualitative assessment regarding whether the user is a human user or not.

In another aspect. an apparatus for determining whether or not an entity generating impressions of an online video advertisement is a human user is disclosed. The apparatus includes an impression module that receives ad viewing information for a user. The apparatus includes a short term usage pattern generation module that generates, based on the ad viewing information, a short term usage pattern for the user. The apparatus further includes a long term usage pattern generation module that generates, based on the ad viewing information, a long term usage pattern for the user, wherein the short term usage pattern is generated over a first time interval that is greater than the second time interval for generating the long term usage pattern. The apparatus further includes a qualitative assessment module that makes, based on the short term usage pattern and the long term usage patterns, a qualitative assessment regarding whether the user is a human user or not.

In another aspect, a method of targeting video advertisements to a user includes estimating, based on a video advertisement viewing history of the user, a daily schedule for the user, receiving a request to display a video advertisement to the user and communicating a bid request to multiple advertisers by including a time parameter based on the estimated daily schedule for the user.

In another aspect, an apparatus for targeting video advertisements to a user is disclosed. The apparatus includes a daily schedule estimation module that estimates, based on a video advertisement viewing history of the user, a daily schedule of the user, a request reception module that receives a request to display a video advertisement to the user, and an ad selector module that selects an advertisement for transmission to the user, based on the estimated daily schedule of the user and a present time.

In yet another aspect, a communication system comprising a user device and a digital video ad insertion server. The user device generates a plurality of requests for receiving a digital video advertisement. The digital video ad insertion server receives the plurality of requests, determines the user device's daily schedule, and selectively determines a characteristic of future placements of advertisements to the user device.

These, and other, aspects are disclosed in greater detail in detailed description below, with reference to the drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Video advertisements can be delivered to online users in various ways. For example, a video advertisement can be sent to a user for playing back prior to providing access to user-requested content. This technique is often called pre-rolling.

In various systems capable of providing video advertisements based on the pre-rolling technique, a number of coordinated message exchanges may happen "behind the scene" between the time a user selects a video content for viewing or clicks on a link (e.g., a user resource locator URL) to the time a video advertisement begins to play out. For example, often, the opportunity to display a video advertisement to the user is auctioned to multiple interested parties, or bidders. Responses are received from the multiple bidders and a decision is made based on the received bids and other system operational rules about a winning bid. The winning bidder is then given the opportunity to display the video advertisement to the user.

The placement and display of a video ad is typically more expensive when compared to the showing of a static display ad (e.g., a banner ad) due to the resources required by video ads, including the level of effectiveness of message delivery and the amount of additional computing and transmission resources associated with the video ads. Furthermore, the added complexity in video ads can lead to one or more several failure points in the end-to-end operation of video advertisement delivery and display. For example, failures may arise due to data corruption during transmission, incompatibility of video encoding format, the user navigating away from a web page before the video advertisement finished playing out, and so on.

Advertisers and ad agencies therefore typically desire a greater billing accuracy when they get billed for video advertisement placements. For example, advertisers may want to know whether or not their ad was played out to a human viewer, rather than an automated or machine-managed playback computer that simulates multiple playbacks of video advertisements to artificially increase the count of ad playouts.

Existing online video advertisement technologies lack the ability to provide feedback to the advertisers on whether a video ad was played out to a human user or a machine. In one presently used technique, during the playback of an ad, a user is explicitly requested to interact with the advertisement (e.g., "press here to continue" or type back text embedded in a graphics displayed to the user). A user may find this interactivity annoying, causing the user to move away from the web page. Thus, techniques that explicitly attempt to verify the presence of a human user may end up hurting an ad campaign by missing out on the opportunity to display a video ad to the user.

Techniques disclosed in this document, in one aspect, can be used for assessing whether an online video advertisement delivered to a user device is being displayed to a human user or a machine. In one aspect, these techniques can be implemented to work passively to make the assessment without providing any explicit instructions to a user to interact with the ad display. A determination is made about a user's viewing habits and daily schedule based on a user's short term and/or long term interactions with online video advertisement. The user's daily schedule is compared with known or determined templates of daily schedules of other human users. For example, in one embodiment, it is checked whether the user exhibits usual human usage such as a long period of inactivity (sleep time) or high level of usage at certain times of user's day (e.g., late evening), etc.

In some embodiments, based on the determination of the user's daily schedule, advertisements, that are suitable for the user's subjective time of day, are targeted to the user. The user's timing data on a user's viewing of day is "subjective" in the sense that the user may be in a different time zone than the time zone in which the decision about targeting ad is made. Therefore, the time zone as perceived by the user (e.g., the time zone of the user) may be used for the targeting. In some embodiments, information of users that are determined not to be human users but computers is stored and is used to exclude such machines from future ad deliveries.

A "user" in this context may not necessarily represent a single human being. In some embodiments, a user may be identified by a unique cookie stored on a computer used by one or more human users. The cookie may be tied to one login user id. For example, for the perspective of a digital video advertisement system, a shared workstation may have multiple users with each user having user-specific login credentials. In some embodiments, a user may not be tied to a specific computer. For example, human users may often be online using one of many connected devices they possess (e.g., a computer, a smartphone, a tablet, etc.). In such a case, the digital advertisement insertion system may track the human user as a single user, regardless of the device being used for the user's online activity.

As used herein, the term "1×1" means an "Impression Pixel." The abbreviation ADM refers to an administrator's dashboard. For media's purposes, this tool may be used to see the fill rate of integrated publishers' ad calls on a daily basis to help optimize delivery of campaigns.

As used herein, the term Billable Impressions means impressions that the advertisement exchange platform gets paid for.

As used herein, the term Billable Revenue refers to the revenue generated from the campaigns, as tracked in the 3rd party reports.

As used herein, the term Behavioral Targeting (referred to as "BT") refers to targeting approach utilizing 3rd party data sets and segmentation to display ads to users who have expressed interest or intent to purchase in certain verticals. Example: in-market for a car, interested in animals/pets, golf enthusiast, etc.

As used herein the term BRX (BrightRoll Ad Exchange) refers to a technology platform, enabling buyers and sellers to access video inventory in a self-service and scalable capacity.

As used herein, the term Buy refers to a user interface for buyers (e.g. advertisers).

As used herein, the term Companion (also called "300× 250" or "banner") refers to a banner running adjacent to preroll and usually remaining persistent and clickable after preroll is completed (size is typically 300×250 pixels).

As used herein, the term Cost refers to publisher costs; tracked by media, paid by finance.

As used herein, the term CPC (cost per click) refers to pricing model in which advertisers pay per click, instead of on a standard CPM model.

As used herein, the term CPE (cost per engagement) refers to cost per video starts.

As used herein, the term CPM (cost per thousand imps) refers to cost per (impressions/1,000). Pricing model for online advertising can be based on impressions or views where the advertiser pays the publisher a predetermined rate for every thousand impressions.

As used herein, the term CPV (cost per view) refers to pricing model based on payment per completed view.

As used herein, the term CTR refers to click through rate, which is a Standard metric used to gauge campaign performance.

As used herein, the term Discrepancy refers to difference between two reporting systems' impression counts.

As used herein, the term Fill rate refers to the percentage of calls an integrated publisher sends that are filled by ads. For example, a publisher could send 500 calls but we may only have 400 ads to send them; therefore, the fill rate would be 80%. If we had 500 ads to send them, the fill rate would be 100%.

As used herein, the term Flight refers to duration of a campaign or line item of an order; broken down by dates.

As used herein, the term Impression pixel refers to a piece of code that tracks impression loads of an ad on a website (also referred to as a 1×1).

As used herein, the term InBanner (shortened to IBV) refers to video running in regular display units (typically 300×250 in sizes).

As used herein, the term Integrated Pub refers to publisher whom we've established both payment terms and completed integration where we can serve videos directly into their player.

As used herein, the term Inventory/Remnant Inventory refers to inventory is the volume of impressions a publisher has available. Remnant inventory is all the unsold inventory a publisher has not been able to sell to direct buyers, and then offers to networks at a discounted rate.

As used herein, the term Margin refers to profit/revenue (in %).

As used herein, the term Pacing—campaign delivery performance with date of flight taken into account refers to total delivered imps/(current days in flight*(total imps/total days)).

As used herein, the term Performance Metrics—the metrics on which a campaign is judged (i.e.: click through rate, completion rate, acquisitions, etc.).

As used herein, the term Preroll refers to an instream ad unit, running ahead of user initiated video content.

As used herein, the term Search & Keyword retargeting refers to a module that allows advertisers to find relevant users identified in our network through use of third-party vendor data and cookie-ing.

As used herein, the term Signed Pub refers to publisher (e.g., an ad viewer-visited web site) with established fixed payment terms with.

As used herein, the term Survey/Study refers to research collected by a 3rd party vendor to establish campaign branding performance.

As used herein, the term Start, Middle and End Pixels (Quartile Reporting) refers to pieces of code that track the duration of the video view. End pixels track completed views. Duration data cannot be gathered without implementing these pixels.

As used herein, the term Third-Party Reporting refers to external ad-server reporting used by clients to verify proper ad delivery (typically DART or Atlas).

As used herein, the term VAST refers to stands for Video Ad Serving Template.

As used herein, the term Video Block refers to a product offering which allows advertisers to buy out a majority of our network during a 1-3 day period. Typically priced on a CPV basis.

As used herein, the term VPAID refers to stands for Video Player-Ad Interface Definition.

Examples of Online Video Advertisement Systems

Figure 1:
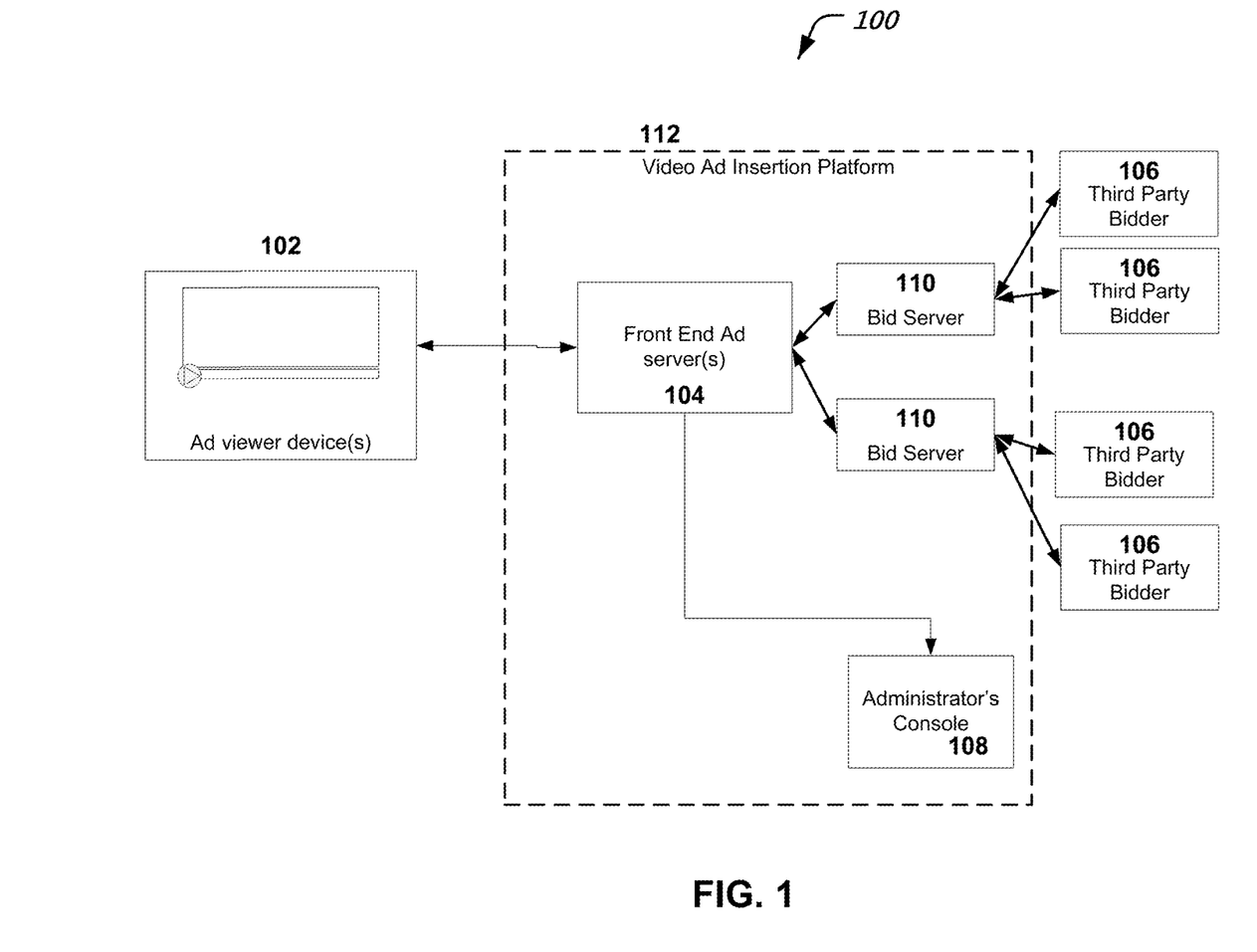
FIG. 1 depicts an example of an online video advertisement system.

FIG. 1 depicts a simplified view of an example of an online video advertisement insertion architecture 100. An ad viewer's device 102 (e.g., a wireless or a mobile device, as discussed above) may be communicatively coupled (e.g., via the internet and a wired or wireless connection) with an ad server 104. The ad server 104 may communicate bids to show video ads to the device 102 to multiple bidders 106 via a plurality of bid server platforms 110. An operator or administrator console 108 may be provided to control the operation of the ad server 104 and bid servers 110. The ad server 104 may also be called front end ad server 104 in the sense that this ad server provides an entry into an online video advertisement system for an ad placement request from a viewer's device. The bid servers 110 provide a bidding interface between third party bidding servers and the online video advertisement service.

The ad server 104 may perform functions such as handling incoming ad requests from multiple ad viewer devices 102, and may respond with an ad or a "no ad" placement. The ad server 104 may operate on a time budget, e.g., 50 to 100 msec., within which it responds to an ad request. The ad server 104 may provide ad data to the viewer device 102 using VAST format. The decision about which advertisement to be sent may be based on various factors and real time data such as publisher placement, uniform resource locator (URL), a geographic location of the viewer device, time of day, demographic segment to which the viewer belongs, and so on.

When the ad server 104 receives a video placement request from the viewer's device 102, the ad server 104 may pass on the request to two or more bid servers 110. The request may include information about the viewer, the viewer's demographic profile and other rules associated with the ad placement opportunity that may influence the selection of a winning bid. In some embodiments, the front end ad servers 104, bid servers 110 and the administrator's console 108 may for a part of a video ad insertion platform 112 offered by a single vendor, e.g., the BRX platform offered by Brightroll, Inc.

The bid servers 110 in turn request bids from multiple third party bidders 106. When bids are received from third party bidders 106, or at the end of a time period (e.g., 90 milliseconds), a decision is made about the winning bid. In some embodiments, the winning bid not only will have the highest dollar value but also should match the demographic profile of the viewer. For example, if the viewer is on the West coast, an advertisement for users on East coast may not be allowed to win bid even when the third party bidder bids the highest dollar value.

The winning bidder is then notified for winning the bid. The winning bidder is provided with information to allow the winning bidder to transmit a video advertisement to the viewer.

In some embodiments, data regarding whether or not the video actually got played back on the viewer's device is collected using impression pixels.

Figure 2:
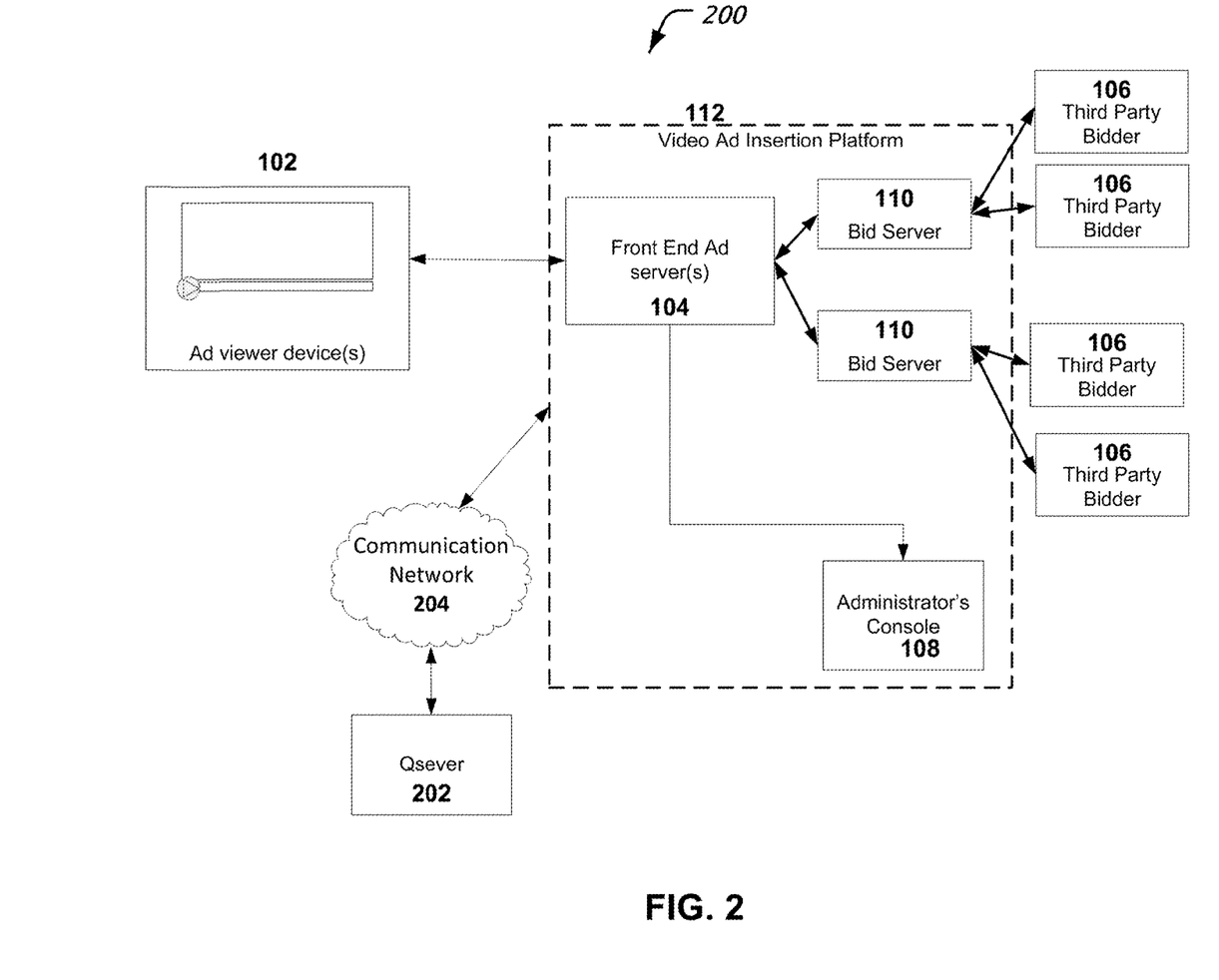
FIG. 2 depicts an example of an online video advertisement system including a mechanism for qualitative user assessment.

FIG. 2 is a block diagram of an example of a digital video advertisement insertion system 200 that includes a qualitative user assessment module 202 (abbreviated as Qserver 202). The Qserver 202 may be embodied using a combination of hardware and/or software. The Qserver 202 may be embodied on one or more hardware platforms that are distributed across the network. In some embodiments, the Qserver 202 may be internal to a video ad insertion platform 112, e.g., may be located on a server managed by a video ad insertion platform vendor. In some embodiments, the Qserver 202 may be external to the video ad insertion platform 112. For example, in some embodiments, the Qserver 202 may be operated by a trusted third party vendor who is in a business arrangement with advertisers and with the video ad insertion platform vendor to audit and check that ads are being served to human users and not to automated machines.

Figure 3:
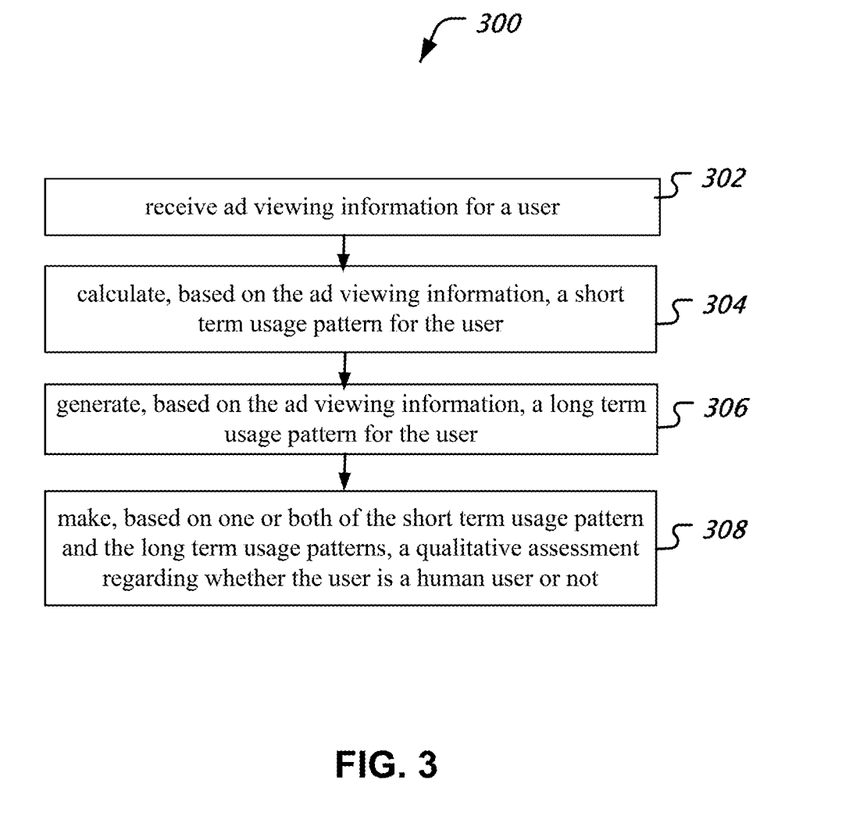
FIG. 3 is a flowchart representation of a method of performing qualitative user assessment.

FIG. 3 is a flowchart representation of an example of a method 300, which may be implemented at the Qserver 202, to make a determination of whether a user receiving a video advertisement is a human user or not.

At 302, the method 300 receives ad viewing information for a user. A user browsing through web pages may request to view a video, e.g., a news video or an entertainment video. The user's selection provides an opportunity to the publisher of the website to present a video advertisement to the user before giving the user access to the requested video. The digital video ad insertion request is communicated from the user's device to the video ad insertion platform 112, and in turn to the Qserver 202. The ad request may include a cookie for the user, which uniquely identifies the user requesting the ad. The method 300 may associate a timestamp with the received ad viewing information.

At 304, the method 300 generates a short term usage pattern for the user. The time interval over which the short term usage pattern is determined may correspond to a typical human reaction time. In some embodiments, the short term usage pattern may correspond to the typical duration of video ad segments. For example, the short term usage pattern may be determined for 1 to 30 second intervals.

At 306, the method 300 generates a long term usage pattern for the user. In some embodiments, the long term usage pattern may span user interactions over multiple days. For example, the method 300 may collect a user's interaction with the user device over a several day (e.g., 5 to 20) period. Within a daily variation of plus-minus a couple of hours, most humans follow a same sleep pattern. Therefore, when averaged over a period of several days, the method 300 may be able to determine that a user shows a period of no activity for 7 hour stretches roughly starting from a time T0 and extending to a time T1 in each 24-hour cycle.

The method 300 may thus generate a long term usage pattern using which the method 300 may identify a sleep time for the user (e.g., periods of complete inactivity). From the estimated subjective sleep time for the user, in some embodiments, the method 300 may establish a day's pattern for the user—e.g., a "night time" for the user (e.g., a time interval in which the user is not interacting with web pages and therefore not generating any video ad placement opportunities), followed by a morning time, followed by a commute time for the user (e.g., when the user is using a low resolution device to generate video ad placement opportunities, an office time for the user, e.g., when the user is online but stops video ad playbacks as soon as it begins, and so on. For each such time division within a user's 24 hour period, the method 300 may then generate a usage pattern for the user. For example, during the user's morning time, the user may on the average be requesting one video advertisement. This request may be for the user's tablet device (as identified by the hardware/software identification of the device). Another user may then not request any video advertisement until late evening, at which time she may request on the average 4 video advertisements every day, etc.

At 308, based on the short term usage pattern and the long term usage pattern, the method 300 makes a qualitative assessment of whether the user is a human being or a machine that is simulating digital video ad viewing. For example, if the short term usage pattern indicates that the user is generating ad requests at a sub-second rate (e.g., once every 500 milliseconds), or in general below a programmable time threshold, then there is a likelihood that the user is not a human user but a machine that is programmed to generate the requests. Similarly, if a user is generating video ad requests at a rate faster than once every 30 seconds, where 30 second video ads are being displayed to the user, then there is a greater possibility that the user is not a human user.

In some embodiments, when a user is determined not to be a human user, the method 300 reports this determination to an audit server for the audit server to take a corrective action to adjusting the video ad insertion charges generated based on the user.

In some embodiments, the method 300 makes the qualitative assessment as follows. The method 300 compares the short term usage pattern for the user with a short term usage template pattern to determine a deviation in the short term usage pattern. The method 300 also compares the long term usage pattern for the user with a long term usage pattern template to determine a deviation in the long term usage pattern. In some embodiments, the short term and long term usage patterns may be derived from a user's past history of usage—e.g., average sleep time, average time online during a time of day, and so on. In some embodiments, the short and long term usage patterns may be derived based on usage patterns of other similar users (e.g., users in the same age group, users in the same geographic area, users browsing the same websites, etc.).

In some embodiments, the method 300 may use a weighted average of the short term and long term deviations to determine whether or not the user is a human user. For example, in some embodiments, the relative weights between the short term and long term usage pattern may be "0" and "1" meaning that the determination is only based on the long term usage pattern. Such may be the case when the digital video advertisement system does not have a responsive connection to the user, making the short term user response readings unreliable. In some embodiments, the relative weights may be "1" and "0" respectively. In this case, the determination is made only using short term usage pattern. This may be the case when the advertisements being sent to the user has an interactive component that prompts the user to respond in certain ways.

In some embodiments, the method 300 may make the qualitative assessment by sequentially performing tests on the short term and long term tests and determining whether or not certain conditions are met. At each test, a determination about human/machine user is made, with the next test performed only if the determination of the previous test is that the user is a human user.

Various long term usage templates can be generated based on real life scenarios. For example, in a given span of 24 hours, it is expected that user activity may be zero during the 5 to 8 hours that the user is sleeping. If the user fails this test, then no other tests are performed and the user is considered to be a machine.

The economic incentives for a rogue entity to simulate video ad consumption may be two-fold. First incentive may be to increase the total volume of video ad consumption. The second incentive may be to achieve video ad consumption at an accelerated rate (compared to human users). In the first scenario, the rogue entity may want to artificially inflate the number of ad viewings by employing multiple computers (or multiple software processes running on the same computer), with each computer/process simulating the rate and pattern of video ad consumption of a human user. In the second scenario, the rogue entity may program a computer to simulate video ad consumption at a rate that is much faster than the rate at which a human can consume video advertisement. The use of long term patterns and short term patterns in determining whether the ad consumption is by a human or a machine thus advantageously addresses both these possible rogue scenarios.

Figure 4:
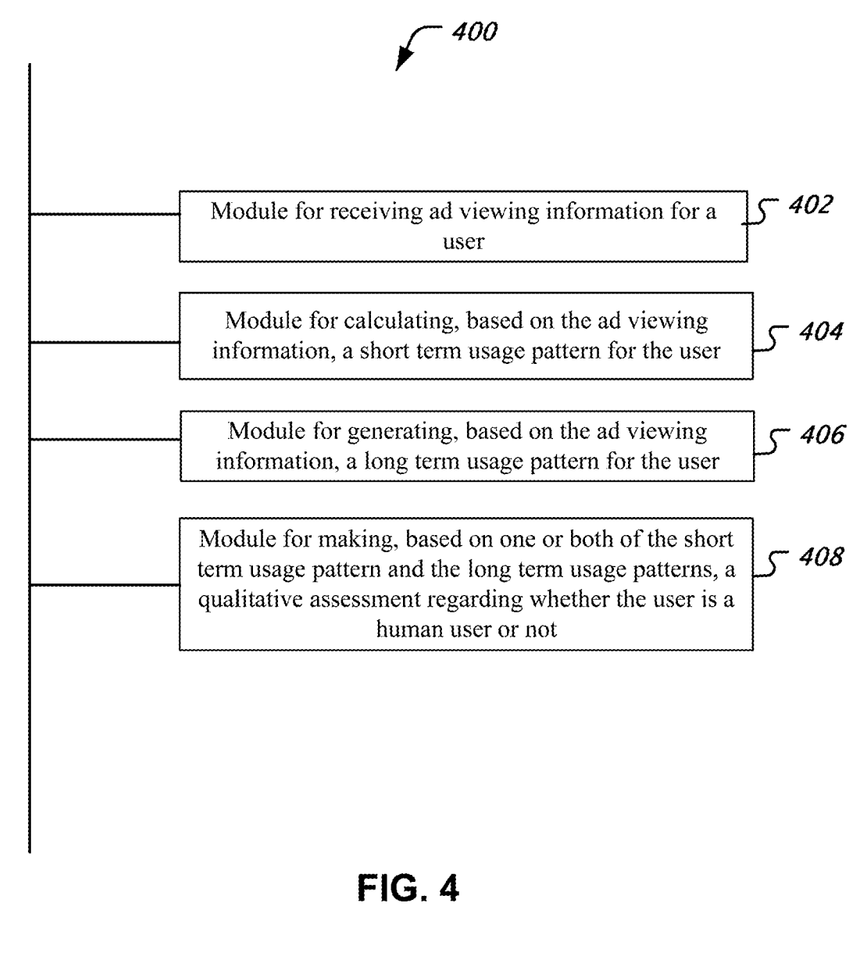
FIG. 4 is a block diagram representation of an apparatus for performing qualitative user assessment.

FIG. 4 is a block diagram representation of an example of an apparatus 400 for determining whether an entity generating impressions of an online video advertisement is a human user or not. The module 402 (e.g., an impression module) is for receiving ad viewing information for a user. The module 404 (e.g., a short term usage pattern generation module) is for calculating, based on the ad viewing information, a short term usage pattern for the user. The module 406 (e.g., a long term usage pattern generation module) is for generating, based on the ad viewing information, a long term usage pattern for the user. As previously disclosed, the short term usage pattern is generated over a first time interval that is smaller than the second time interval for generating the long term usage pattern. The module 408 (e.g., a qualitative assessment module) is for making, based on one or both of the short term usage pattern and the long term usage patterns, a qualitative assessment regarding whether the user is a human user or not. The apparatus 400 and modules 402, 404, 406 and 408 may further be configured to implement some of the techniques disclosed in the present document.

In some embodiments, when a user's sleep pattern is known, a determination can be made regarding a user's daily routine based on the user's subjective time-of-day based on his sleep time. For example, over multiple 24 hour periods, an underlying pattern of sleep and interaction when awake can be seen to be approximately repetitive. Using an analysis (e.g., averaging) of the past 24 hour cycles, a prediction can be made about a user's upcoming 24 hour pattern. For example, when a user is not interacting for 5 hours that approximately coincide with his sleep time, chances are high that no interaction will occur for another 2 to 3 hours. However, in the next two hours after the user's first interaction after the estimated sleep time would be the user's subjective morning time. Also, the user's past history may suggest that the user typically is receptive to a certain information genre (e.g., financial news web sites or daily fashion updates, etc.) during the first two hours after waking up. Such information about the user's time-of-day information genre preferences can be used to target advertisements to the user. For example, coffee or cereal advertisements may be shown to the viewers during the first two hours after the end of the user's subjective sleep time.

In some embodiments, the subjective time-of-day information may be used to control playout rate of certain ads to a user (i.e., control a rate at which an advertiser's digital video ads are being sent to the user). For example, an ad campaign may specify a rule that ads from the same advertisers should not be shown to a user more than 3 times. Based on this rule, the user may be shown a specific advertiser's ad no more than three times between two consecutive subjective sleep periods for the user. In some embodiments, these ads may be evenly spread out, per ad campaign specification, so that one ad is displayed in the morning period, one in the afternoon period and a third one in the evening period. In one beneficial aspect of this method, the controlled metering of ads does not need to know the geographic location (time zone) of the user.

In one targeted ad delivery method embodiment, a record of ads delivered to a user is maintained. Impressions are received from the user, including information about the ads watched by the user. By analyzing the time periodicity of the impressions, the user's subjective daily schedule is estimated. Based on the subjective daily schedule and a current time of day, an advertisement delivery parameter at the current time is controlled. In some embodiments, the delivery parameter comprises an instantaneous delivery rate of ads to the user. In some embodiments, the delivery parameter comprises a genre of advertisement being sent to the user based on the subjective time of the day for the user.

Figure 5:
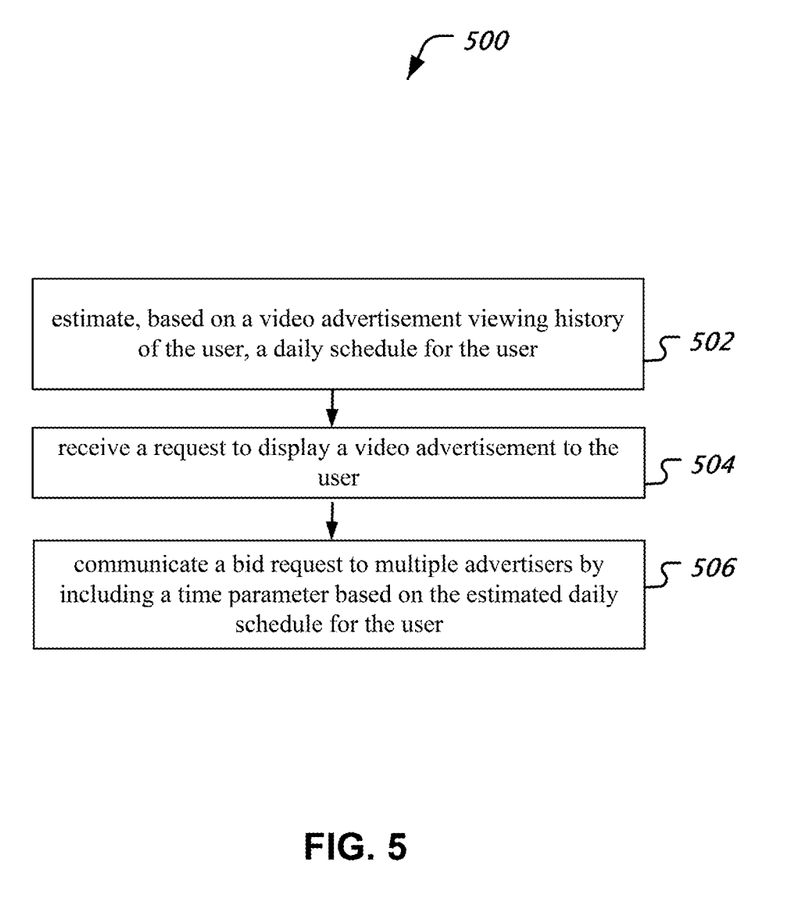
FIG. 5 is a flowchart representation of a method of targeting advertisements based on qualitative user assessment.

FIG. 5 is a flowchart depiction of an example of a method 500 of targeting video advertisements to a user. In some embodiments, the method 500 is implemented on a computer, e.g., Qserver 202.

At 502, the method 500 estimates, based on a video advertisement viewing history of the user, a daily schedule for the user. Various techniques for estimating a user's daily schedule (e.g., sleep time, morning time, etc.) are disclosed in the present document. For example, in some embodiments, estimating the daily schedule includes determining a sleep time for the user based on a period of inactivity by the user in a 24 hour interval. In some embodiments, estimating the schedule may be performed by dividing the daily schedule into multiple time periods, associating a level of user activity for each of the multiple time periods, and including the level of user activity with the time parameter.

At 504, the method 500 receives a request to display a video advertisement to the user. The request is generated, e.g., by the user's device, upon receiving a user command to access certain content from a web site (e.g., a news article of a video program).

At 506, the method 500 communicates a bid request to multiple advertisers by including a time parameter based on the estimated daily schedule for the user. In some embodiments, the time parameter may include a user's subjective time of day. In some embodiments, the time parameter may include information about genre of advertisement that is preferable by the user at the present time.

Figure 6:
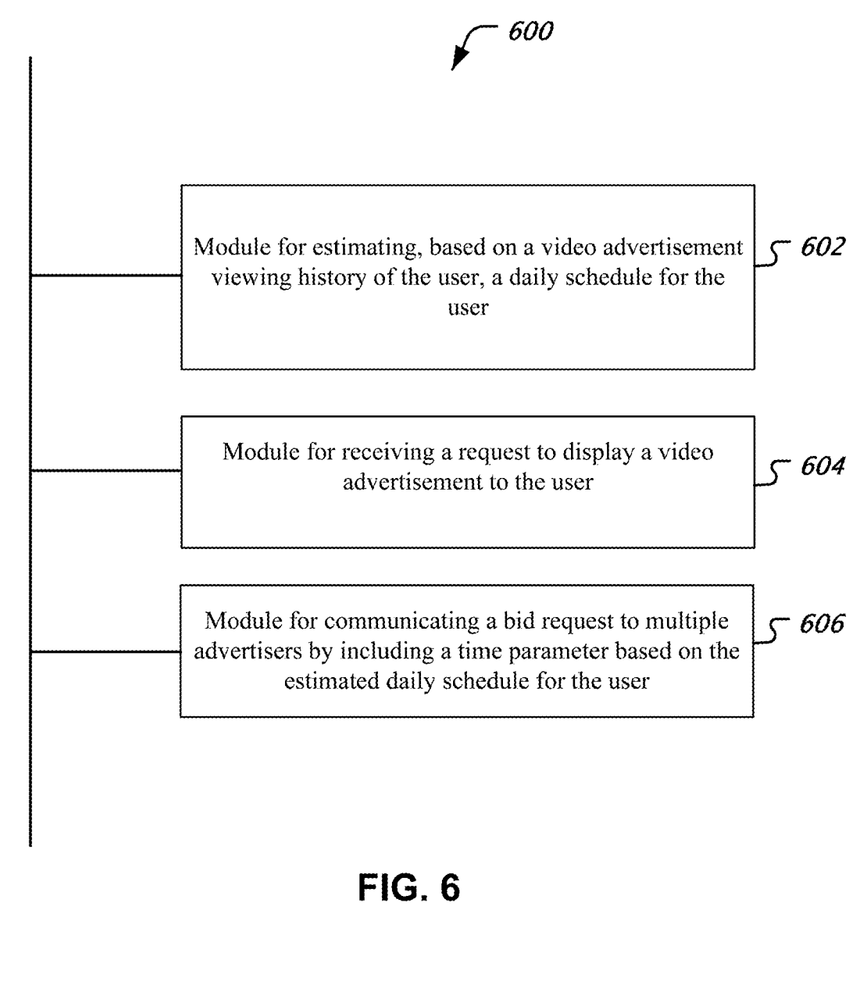
FIG. 6 is a block diagram representation of an apparatus for targeting advertisements based on qualitative user assessment.

FIG. 6 is a block diagram representation of an example of an apparatus 600 for targeting video advertisements to a user, based on the user's time-of-day preferences. The module 602 (e.g., a daily schedule estimation module) is for estimating, based on a video advertisement viewing history of the user, a daily schedule for the user. The module 604 (e.g., a request reception module) is for receiving a request to display a video advertisement to the user. The module 606 (e.g., an ad selector module) is for selecting an advertisement for transmission to the user, based on the estimated daily schedule of the user and a present time. The apparatus 600 and modules 602, 604 and 606 may further be configured to implement some of the techniques disclosed in the present document.

In some embodiments, a communication system includes a user device that generates a plurality of requests for receiving a digital video advertisement and a digital video ad insertion server that receives the plurality of requests, determines the user device's daily schedule, and selectively determines a characteristic of future placements of advertisements to the user device.

Various techniques for determining whether video advertisements are being delivered to a human user or a machine are disclosed. In one aspect, the determination is made passively, without having the user to perform any explicit actions. Based on the time and frequency of ad requests generated from a user device, a daily schedule is estimated for the user. The estimated daily schedule is compared with a daily schedule pattern to determine whether the user is a human user or not.

In some embodiments, the estimated daily schedule of a user is further used to target advertisements to the user. The genre of a video ad being sent to the user at a current time may be selected based on the current time in relation to the subjective daily schedule of the user and the user's past ad viewing behavior for the present subjective time of day for the user.

The disclosed and other embodiments, modules and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method for determining whether an entity generating impressions for an online video advertisement is human, comprising:
   receiving, at a computer, ad viewing information for a user;
   calculating, by the computer, based on the ad viewing information for the user, a short term usage pattern for the user, the short term usage pattern reflecting user interaction with the online video advertisement;
   comparing, by the computer, the short term usage pattern with a short term usage template and determining a first deviation in the short term usage pattern;
   generating, by the computer, based on the ad viewing information for the user, a long term usage pattern for the user, wherein the short term usage pattern is generated over a first time interval that is smaller than a second time interval for generating the long term usage pattern, and wherein the long term usage pattern for the user comprises an indication of (i) a plurality of time periods of a day and (ii) a first set of levels of activity comprising at least one level of activity for each time period of the plurality of time periods of the day;
   comparing, by the computer, the long term usage pattern with a long term usage template indicative of (i) the plurality of time periods of the day and (ii) a second set of levels of activity comprising at least one level of activity for each time period of the plurality of time periods of the day, and determining a second deviation in the long term usage pattern based on the comparing the long term usage pattern with the long term usage template, wherein the comparing the long term usage pattern with the long term usage template comprises comparing the first set of levels of activity with the second set of levels of activity, wherein the comparing the long term usage pattern with the long term usage template comprises determining whether the user exhibits usual human usage comprising a sleep pattern indicative of a long period of inactivity associated with a daily sleep time of the user;

making, by the computer, a qualitative assessment regarding whether or not the user is a human user based on at least one of the first deviation in the short term usage pattern or the second deviation in the long term usage pattern, wherein the qualitative assessment is based on at least one of:
- a determination of whether the user generates video ad requests, from the user to at least one server, at a first rate faster than once per first period of time, wherein the first period of time corresponds to a programmable time; or
- a determination of whether the user generates video ad requests for the online video advertisement, from the user to at least one server, at a second rate faster than once per second period of time, wherein the second period of time corresponds to a length of the online video advertisement;

upon a determination that the user is not a human user, automatically reporting, by the computer, the determination that the user is not a human user to an audit server for adjusting online video advertisement insertion charges that are generated based on activity of the user; and making, by the computer, a second qualitative assessment regarding whether or not a second user is a human user, wherein the second qualitative assessment is based on at least one of:
- a determination of whether the second user generates video ad requests, from the second user to at least one server, at a third rate faster than once per the first period of time; or
- a determination of whether the second user generates video ad requests for the online video advertisement, from the second user to at least one server, at a fourth rate faster than once per the second period of time.

2. The method of claim 1, comprising:
identifying one or more similar users associated with the user based on the one or more similar users being associated with a same age group as the user; and
deriving at least one of the short term usage pattern or the long term usage pattern based on one or more usage patterns of the one or more similar users.

3. The method of claim 1, comprising:
identifying one or more similar users associated with the user based on the one or more similar users being associated with a same geographic area as the user; and
deriving at least one of the short term usage pattern or the long term usage pattern based on one or more usage patterns of the one or more similar users.

4. The method of claim 1, comprising:
identifying one or more similar users associated with the user based on the one or more similar users being associated with a same set of browsed websites as the user; and
deriving at least one of the short term usage pattern or the long term usage pattern based on one or more usage patterns of the one or more similar users.

5. The method of claim 1, comprising:
estimating a subjective daily schedule for the user, and selecting, at a current time, a type of advertisements sent to the user based on the current time in relation to the subjective daily schedule for the user.

6. The method of claim 1, comprising:
upon a determination that the second user is not a human user, automatically reporting, by the computer, the determination that the second user is not a human user to the audit server.

7. An apparatus for determining whether or not an entity generating impressions of an online video advertisement is a human user, comprising:
a computer-readable storage medium; and
a processor configured to execute instructions stored in the computer-readable storage medium and to act as:
- an impression module configured to receive ad viewing information for a user;
- a short term usage pattern generation module configured to generate, based on the ad viewing information for the user, a short term usage pattern for the user, the short term usage pattern reflecting user interaction with the online video advertisement;
- a first comparison module configured to compare the short term usage pattern with a short term usage template and to determine a first deviation in the short term usage pattern;
- a long term usage pattern generation module configured to generate, based on the ad viewing information for the user, a long term usage pattern for the user, wherein the short term usage pattern is generated over a first time interval that is greater than a second time interval for generating the long term usage pattern, and wherein the long term usage pattern for the user comprises an indication of (i) a plurality of time periods of a day and (ii) a first set of levels of activity comprising at least one level of activity for each time period of the plurality of time periods of the day;
- a second comparison module configured to compare the long term usage pattern with a long term usage template indicative of (i) the plurality of time periods of the day and (ii) a second set of levels of activity comprising at least one level of activity for each time period of the plurality of time periods of the day, and determining a second deviation in the long term usage pattern based on the comparing the long term usage pattern with the long term usage template, wherein the comparing the long term usage pattern with the long term usage template comprises comparing the first set of levels of activity with the second set of levels of activity, wherein the comparing the long term usage pattern with the long term usage template comprises determining whether the user exhibits usual human usage comprising a sleep pattern indicative of a long period of inactivity associated with a daily sleep time of the user; and
- a qualitative assessment module configured to:
  make a qualitative assessment regarding whether or not the user is a human user based on at least one of the first deviation in the short term usage pattern or the second deviation in the long term usage pattern, wherein the qualitative assessment is based on a determination of whether the user generates video ad requests at a first rate faster than once per first period of time, wherein the first period of time corresponds to a programmable time;

upon a determination that the user is not a human user, report the determination that the user is not a human user to an audit server that is configured to adjust online video advertisement insertion charges that are generated based on activity of the user; and make a second qualitative assessment regarding whether or not a second user is a human user, wherein the second qualitative assessment is based on a determination of whether the second user generates video ad requests at a second rate faster than once per the first period of time.

8. The apparatus of claim 7, wherein the processor is configured to execute instructions stored in the computer-readable storage medium and to act as:
a billing communication module configured to report the qualitative assessment to a billing server.

9. The apparatus of claim 7, wherein the processor is configured to execute instructions stored in the computer-readable storage medium and to act as:
a weighted average module configured to compute a weighted average of the first deviation and the second deviation; and
a determination module configured to perform the qualitative assessment by comparing the weighted average with a predetermined threshold.

10. The apparatus of claim 7, wherein the qualitative assessment module comprises a test sequence module configured to perform a sequence of tests such that, at each test, a corresponding intermediate qualitative assessment is made, with a next test in the sequence of tests performed only if an intermediate qualitative assessment in a previous test is that the user is not a machine.

11. The apparatus of claim 7, wherein the processor is configured to execute instructions stored in the computer-readable storage medium and to act as:
a daily schedule determination module configured to estimate a subjective daily schedule for the user, and
a target ad module configured to select a type of advertisements sent to the user based on a determination of a current time of day for the user.

12. The apparatus of claim 7, wherein the qualitative assessment module is configured to:
upon a determination that the second user is not a human user, report the determination that the second user is not a human user to the audit server.

13. A non-transitory computer readable medium having stored thereon instructions that when executed cause performance of operations, the operations comprising:
receiving, at a computer, ad viewing information for a user;
calculating, by the computer, based on the ad viewing information for the user, a short term usage pattern for the user, the short term usage pattern reflecting user interaction with an online video advertisement;
comparing, by the computer, the short term usage pattern with a short term usage template and determining a first deviation in the short term usage pattern;
generating, by the computer, based on the ad viewing information for the user, a long term usage pattern for the user, wherein the short term usage pattern is generated over a first time interval that is smaller than a second time interval for generating the long term usage pattern, and wherein the long term usage pattern for the user comprises an indication of (i) a plurality of time periods of a day and (ii) a first set of levels of activity comprising at least one level of activity for each time period of the plurality of time periods of the day;

comparing, by the computer, the long term usage pattern with a long term usage template indicative of (i) the plurality of time periods of the day and (ii) a second set of levels of activity comprising at least one level of activity for each time period of the plurality of time periods of the day, and determining a second deviation in the long term usage pattern based on the comparing the long term usage pattern with the long term usage template, wherein the comparing the long term usage pattern with the long term usage template comprises comparing the first set of levels of activity with the second set of levels of activity, wherein the comparing the long term usage pattern with the long term usage template comprises determining whether the user exhibits usual human usage comprising a sleep pattern indicative of a long period of inactivity associated with a daily sleep time of the user;

making, by the computer, a qualitative assessment regarding whether or not the user is a human user based on at least one of the first deviation in the short term usage pattern or the second deviation in the long term usage pattern, wherein the qualitative assessment is based on a determination of whether the user generates video ad requests for the online video advertisement at a first rate faster than once per first period of time, wherein the first period of time corresponds to a length of the online video advertisement;

upon a determination that the user is not a human user, automatically reporting, by the computer, the determination that the user is not a human user to an audit server for adjusting online video advertisement insertion charges that are generated based on activity of the user; and making, by the computer, a second qualitative assessment regarding whether or not a second user is a human user, wherein the second qualitative assessment is based on a determination of whether the second user generates video ad requests for the online video advertisement at a second rate faster than once per the first period of time.

14. The non-transitory computer readable medium of claim 13, the operations comprising:
reporting the qualitative assessment to a billing server.

15. The non-transitory computer readable medium of claim 13, wherein the making the qualitative assessment comprises:
performing a sequence of tests such that, at a first test, an intermediate qualitative assessment is made, with a next test in the sequence of tests performed responsive to determining that the intermediate qualitative assessment in the first test is that the user is a human user.

16. The non-transitory computer readable medium of claim 13, comprising:
estimating a subjective daily schedule for the user.

17. The non-transitory computer readable medium of claim 16, comprising:
selecting, at a current time, a type of advertisements sent to the user based on the current time in relation to the subjective daily schedule for the user.

18. The non-transitory computer readable medium of claim 13, comprising:
generating the long term usage template based on daily schedules of a plurality of users.

19. The non-transitory computer readable medium of claim 13, comprising:
- identifying one or more similar users associated with the user based on the one or more similar users being associated with a same age group as the user, a same geographic area as the user and a same set of browsed websites as the user; and
- deriving at least one of the short term usage pattern or the long term usage pattern based on one or more usage patterns of the one or more similar users.

20. The non-transitory computer readable medium of claim 13, the operations comprising:
- upon a determination that the second user is not a human user, automatically reporting, by the computer, the determination that the second user is not a human user to the audit server.

* * * * *